US011300947B2

(12) United States Patent
Hitomi

(10) Patent No.: US 11,300,947 B2
(45) Date of Patent: Apr. 12, 2022

(54) DISPLAY DEVICE FOR MACHINING PROGRAM

(71) Applicant: FANUC CORPORATION, Yamanashi (JP)

(72) Inventor: Ryuta Hitomi, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 178 days.

(21) Appl. No.: 16/674,292

(22) Filed: Nov. 5, 2019

(65) Prior Publication Data

US 2020/0142386 A1 May 7, 2020

(30) Foreign Application Priority Data

Nov. 6, 2018 (JP) .............................. JP2018-208789

(51) Int. Cl.
G06F 9/44 (2018.01)
G05B 19/4155 (2006.01)
G05B 19/042 (2006.01)
G06F 8/33 (2018.01)

(52) U.S. Cl.
CPC ....... *G05B 19/4155* (2013.01); *G05B 19/042* (2013.01); *G06F 8/33* (2013.01)

(58) Field of Classification Search
None
See application file for complete search history.

(56) References Cited

U.S. PATENT DOCUMENTS

2017/0285614 A1* 10/2017 Kawai ................. G05B 19/409
2018/0169816 A1* 6/2018 Hori ....................... H04N 7/181

FOREIGN PATENT DOCUMENTS

| JP | H5-6683 B2 | 1/1993 |
| JP | H643923 A | 2/1994 |
| JP | 2005122588 A | 5/2005 |
| JP | 20103287 A | 1/2010 |

* cited by examiner

Primary Examiner — Anna C Deng
(74) Attorney, Agent, or Firm — Hauptman Ham, LLP

(57) ABSTRACT

A display device for a machining program has a function of displaying a modal state. The display device includes a program analysis unit that inputs the machining program and that identifies an attention block in the machining program, a modal effective range analysis unit that identifies a modal state that is effective in the attention block and an effective range of the modal state, and a modal effective range display unit that visually displays the effective range of the modal state along with the machining program.

10 Claims, 5 Drawing Sheets

DISPLAY DEVICE FOR MACHINING PROGRAM

RELATED APPLICATION

The present application claims priority to Japanese Application Number 2018-208789 filed Nov. 6, 2018, the disclosure of which is hereby incorporated by reference herein in its entirety.

BACKGROUND OF THE INVENTION

1. Field of the Invention

The present invention relates to a display device for a machining program and particularly relates to a display device for a machining program that has a function of displaying a modal state.

2. Description of the Related Art

Some of G codes that are used in machining programs are modal G codes whose configurations are effective until the configurations are altered or canceled. Specifically, a configuration based on a modal G code is maintained from a block in which the modal G code is commanded to a block in which the G code is canceled or a block in which another G code in a group of the former G code is commanded.

Conventionally, a user who edits a machining program is required to memorize a modal G code that is commanded before and nearest to a block to be edited, in order to know a modal state of the block to be edited. For instance, a user illustrated in FIG. 1 edits a machining program while memorizing modal G codes "G54.4" and "G43.4" that are effective in a block to be edited.

In such an editing method, a lapse of memory may result in a mistake such as forgetting of the modal G codes that are currently effective or forgetting of cancellation of the modal G codes (FIG. 2), for instance. Though careful tracing of the machining program enables reduction in or correction of such mistakes, such work is extremely troublesome and time-consuming.

As a related art, there is Japanese Examined Patent Application Publication No. 5-6683. In Japanese Examined Patent Application Publication No. 5-6683, a numerical controller for interactively creating a machining program by operation on an operation board while watching a display on display means classifies G codes, inputted in each block including the G codes in the machining program, into modal G codes and unmodal G codes. Therein, the numerical controller is disclosed which includes G code determination means which determines whether a pertinent G code that is modal is usable or not in relation to modal G codes inputted in preceding blocks and display control means which makes the display means display the G code in case where the G code determination means determines that the G code is usable.

Problems described above, however, are still unsolved because the numerical controller disclosed in Japanese Examined Patent Application Publication No. 5-6683 is incapable of displaying the G codes that are currently effective or visually displaying ranges in which the modal G codes are effective.

SUMMARY OF THE INVENTION

The present invention is intended for settling such problems. An object of the invention is to provide a display device for a machining program that has a function of displaying a modal state.

A display device for a machining program according to an embodiment of the present invention is characterized in that the display device includes a program analysis unit that inputs the machining program and that identifies an attention block in the machining program, a modal effective range analysis unit that identifies a modal state which is effective in the attention block and an effective range of the modal state, and a modal effective range display unit that visually displays the effective range of the modal state along with the machining program.

The display device for the machining program according to an embodiment of the invention is characterized in that the modal effective range display unit displays a band-like object at a side of a plurality of blocks in the machining program that correspond to the effective range of the modal state.

The display device for the machining program according to an embodiment of the invention is characterized in that the modal effective range display unit displays the plurality of blocks in the machining program that correspond to the effective range of the modal state, with use of a graphic object.

The display device for the machining program according to an embodiment of the invention is characterized in that the modal effective range display unit alters a background of the plurality of blocks in the machining program that correspond to the effective range of the modal state.

The display device for the machining program according to an embodiment of the invention is characterized in that the modal effective range display unit displays a mark for each of blocks in the machining program that are included in the effective range of the modal state.

The display device for the machining program according to an embodiment of the invention is characterized in that the display device further includes a modal list display unit that displays a name of the modal state that is effective in the attention block and in that a color, a pattern, a luminance, or a mark that is used when the modal effective range display unit displays the effective range of the modal state is made identical to a color, a pattern, a luminance, or a mark that is used when the modal list display unit displays the name of the modal state.

The display device for the machining program according to an embodiment of the invention is characterized in that the modal effective range display unit selectively displays only specified modal states among modal states that are effective in the attention block.

The display device for the machining program according to an embodiment of the invention is characterized in that the attention block is a block where a cursor position is located in editing of the machining program.

The display device for the machining program according to an embodiment of the invention is characterized in that the attention block is a block that is being executed in running of the machining program.

According to the invention, the display device for the machining program that has the function of displaying the modal state may be provided.

BRIEF DESCRIPTION OF THE DRAWINGS

The above-mentioned and other objects and features of the present invention will become apparent from the following description of an embodiment with reference to the accompanying drawings, in which.

DETAILED DESCRIPTION OF THE PREFERRED EMBODIMENT

Figure 1:
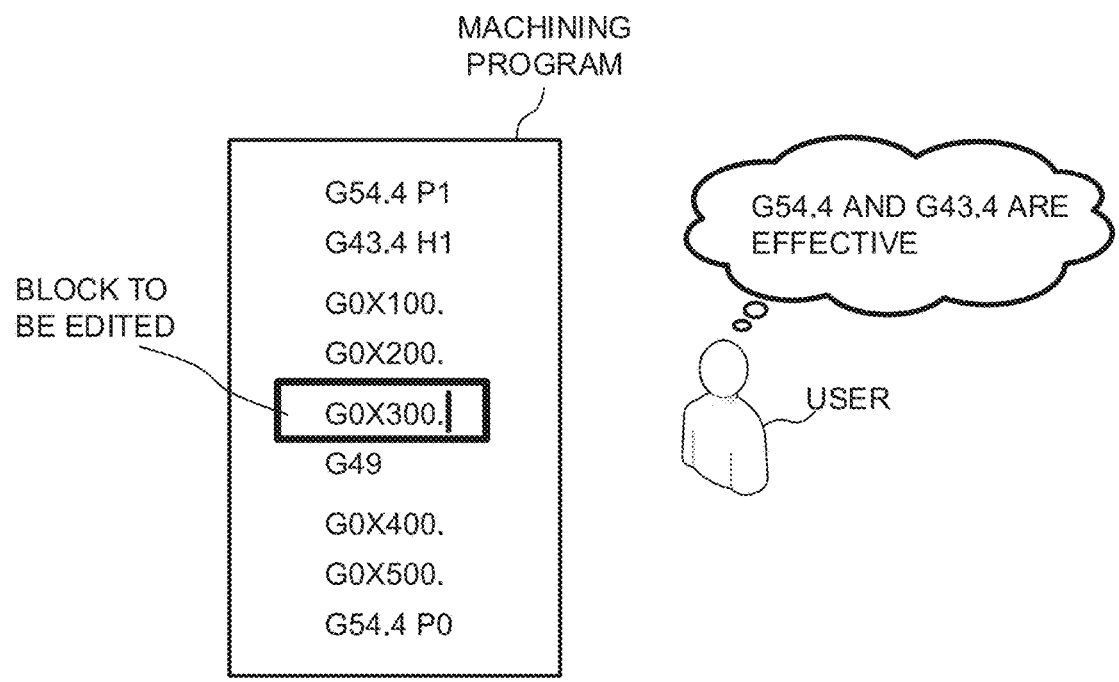
FIG. 1 is a diagram illustrating a problem in a conventional display device for a machining program.
Figure 2:
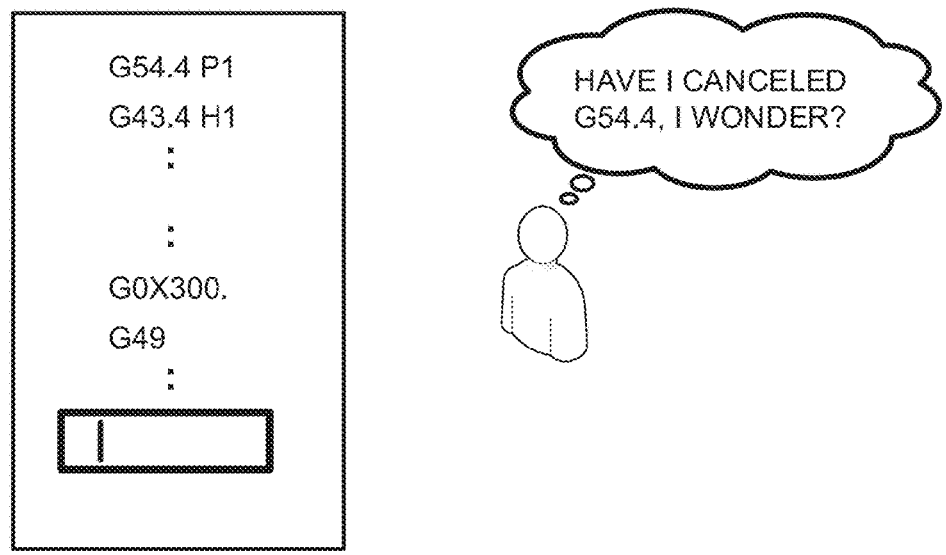
FIG. 2 is a diagram illustrating the problem in the conventional display device for the machining program.
Figure 3:
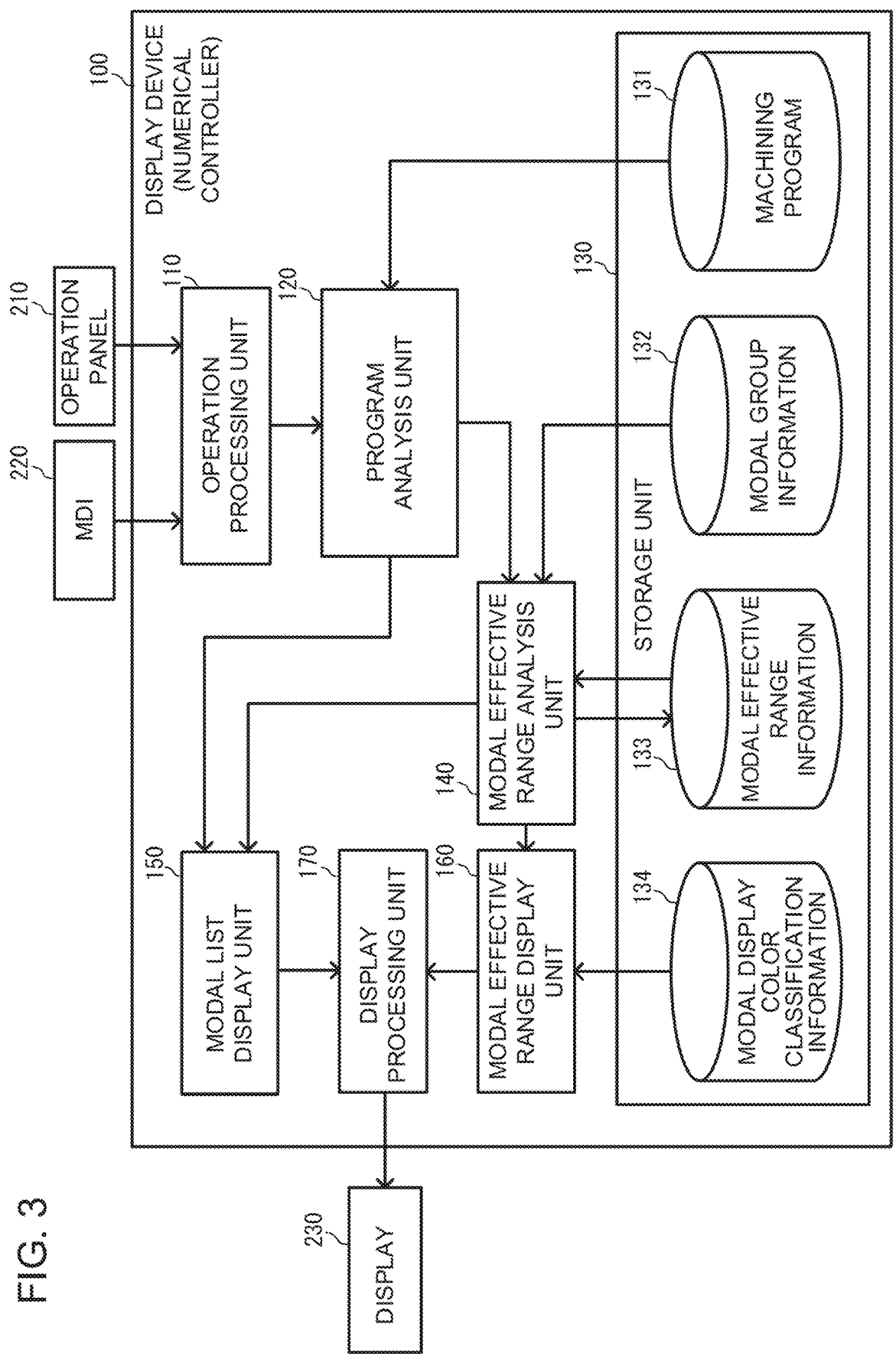
FIG. 3 is a diagram illustrating a configuration of a display device for a machining program.

FIG. 3 is a block diagram illustrating a configuration example of a display device 100 for a machining program according to an embodiment of the present invention. Typically, the display device 100 for the machining program is a numerical controller. The display device 100, however, may be any information processing device that is capable of displaying the machining program. The display device 100 for the machining program includes an operation processing unit 110, a program analysis unit 120, a storage unit 130, a modal effective range analysis unit 140, a modal list display unit 150, a modal effective range display unit 160, and a display processing unit 170. An operation panel 210, an MDI 220, and a display 230 are connected to the display device 100 for the machining program.

The storage unit 130 stores a machining program 131, modal group information 132, modal effective range information 133, and modal display color classification information 134. Contents of those types of information will be described later.

The operation processing unit 110 receives input operations (cursor movement, input of characters, or the like) that are carried out by a user with use of the operation panel 210 or the MDI 220.

The program analysis unit 120 reads out the machining program 131 from the storage unit 130 and analyzes what types of G codes are used in each block in the program. In addition, the program analysis unit 120 identifies a position (block) in the machining program 131 where a cursor is located, in other words, a position (block) in the machining program 131 that is being currently edited by the user. Herein, the block is referred to as attention block.

The modal effective range analysis unit 140 refers to the modal group information 132 and the modal effective range information 133 in the storage unit 130 and identifies modal G codes (which will be referred to as modal states) that are effective at the cursor position and effective ranges (start point blocks and end point blocks of the effective ranges) of the modal G codes. Upon a change in the cursor position by the user, the operation processing unit 110 detects the change and notifies the modal effective range analysis unit 140 of the change and the modal effective range analysis unit 140 identifies modal G codes that are effective at a new cursor position and effective ranges of the modal G codes.

Herein, the modal group information 132 is a table that defines a descriptive text on a function each of modal G codes means. The modal effective range information 133 is a table that defines a group name of each of the modal G codes and G codes for cancellation of modal state. A modal state activated by a command of a modal G code is altered or canceled when a modal G code in the same group or a G code for cancellation is commanded.

The display processing unit 170 makes a display on the display 230 of display contents generated by the modal list display unit 150 and the modal effective range display unit 160 that will be described later.

Figure 4:
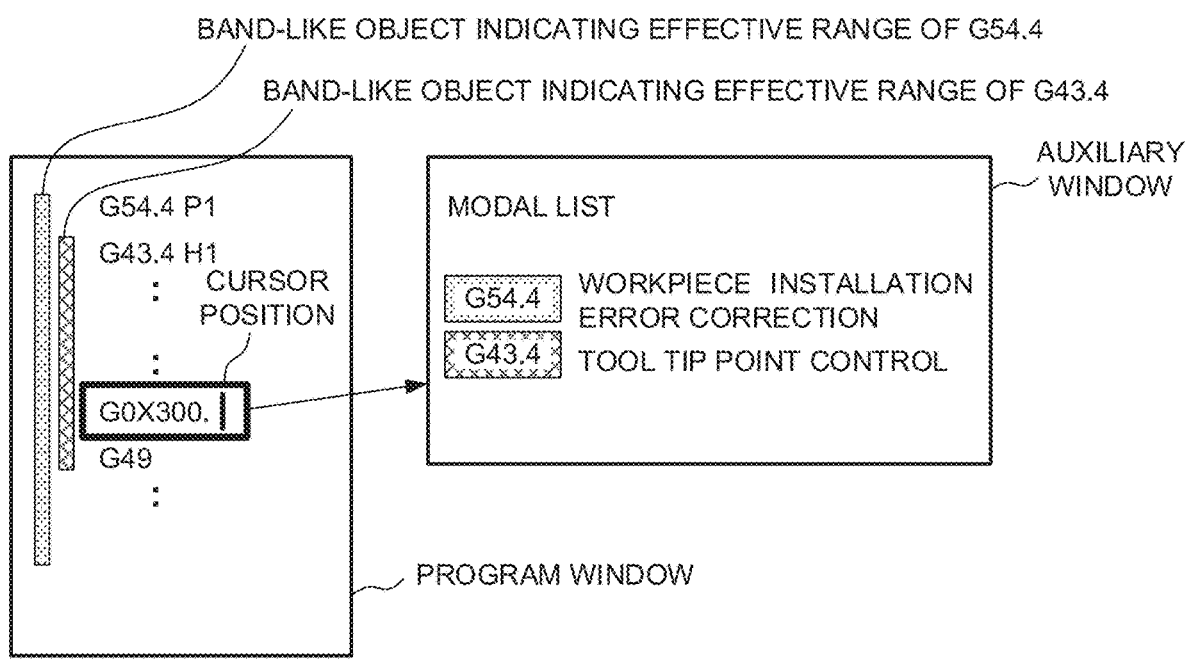
FIG. 4 is a diagram illustrating an example of display by the display device for the machining program.

The modal list display unit 150 presents names of the modal G codes that are effective at the cursor position to the user with use of character information or the like. Specifically, the modal list display unit 150 acquires the modal G codes that are effective at the current cursor position, from the modal effective range analysis unit 140. Then the modal list display unit 150 is capable of displaying such an auxiliary window as illustrated in FIG. 4, for instance. In this auxiliary window "MODAL LIST", the names of the modal G codes "G54.4" and "G43.4" that are currently effective and descriptive texts "Workpiece installation error correction" and "Tool tip point control" on functions the G codes mean are displayed.

The modal effective range display unit 160 visually displays the modal G codes that are effective at the cursor position and the effective ranges of the same, on the machining program. Specifically, the modal effective range display unit 160 acquires the modal G codes that are effective at the cursor position and the effective ranges (the start point blocks and the end point blocks of the effective ranges) of the modal G codes, from the modal effective range analysis unit 140. Then the modal effective range display unit 160 displays the effective ranges of the modal G codes "G54.4" and "G43.4" that are currently effective, with use of band-like objects in such a program window as illustrated in FIG. 4, for instance. The modal G code "G43.4" is effective from a block "G43.4 H1" where the G code is commanded to "G49" that means the cancellation of the modal G code and thus a band-like object is placed at left of blocks from "G43.4 H1" to "G49". A band-like object is similarly placed with regard to the effective range of the modal G code "G54.4".

The band-like objects are provided in a number of the modal G codes that are effective at the cursor position and are parallelly displayed. On condition that a plurality of band-like objects are displayed, the band-like objects are preferably displayed so as to differ in color, pattern, luminance, or the like. Display colors, background colors, or the likes for the modal G codes that are displayed in the auxiliary window and that are currently effective, for instance, may be displayed with the same colors, patterns, luminances, or the likes that the corresponding band-like objects have, so that correspondence between the program window and the auxiliary window may be determined. The modal effective range display unit 160 is capable of identifying the colors, patterns, luminances, or the likes that are to be used, with reference to the modal display color classification information 134 in the storage unit 130. The modal display color classification information 134 is a table in which a color, a pattern, a luminance, a shape of a mark (which will be described later), or the like is associated with each modal G code.

Figure 5:
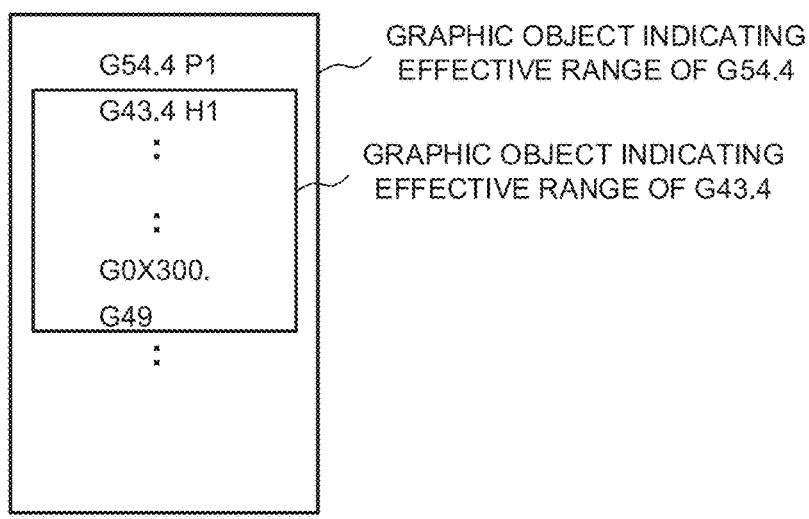
FIG. 5 is a diagram illustrating an example of display by the display device for the machining program.

FIGS. 5 to 8 illustrate other forms of the program window in which the effective ranges of the modal G codes that are currently effective are displayed. As illustrated in FIG. 5, the modal effective range display unit 160 may display the effective ranges of the modal G codes that are currently effective, with use of graphic objects that are rectangles enclosing blocks. In this example, the blocks from "G43.4 H1" to "G49" that constitute the effective range of the modal G code "G43.4" are enclosed in one rectangle. Similarly, the effective range of the modal G code "G54.4" is enclosed in another rectangle.

Figure 6:
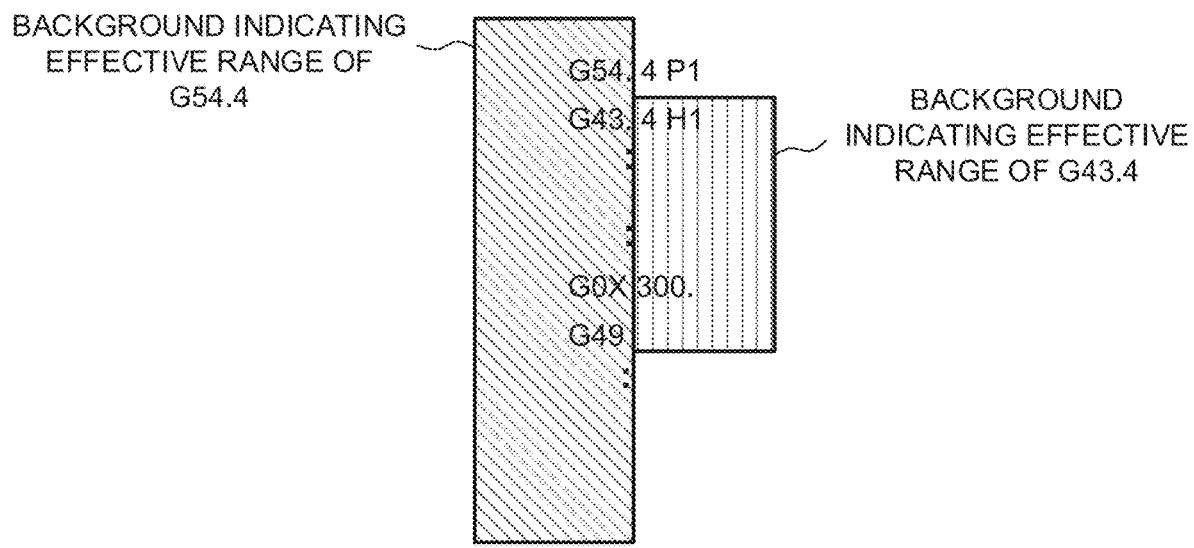
FIG. 6 is a diagram illustrating an example of display by the display device for the machining program.

As illustrated in FIG. 6, the modal effective range display unit 160 may display the effective ranges of the modal G codes that are currently effective, by alteration in backgrounds of the blocks. In this example, a portion of the background of the blocks from "G43.4 H1" to "G49" that constitute the effective range of the modal G code "G43.4" is displayed with a color, a pattern, a luminance, or the like that is specified. Similarly, a portion of the background of the effective range of the modal G code "G54.4" is displayed with another color, pattern, luminance, or the like.

Figure 7:
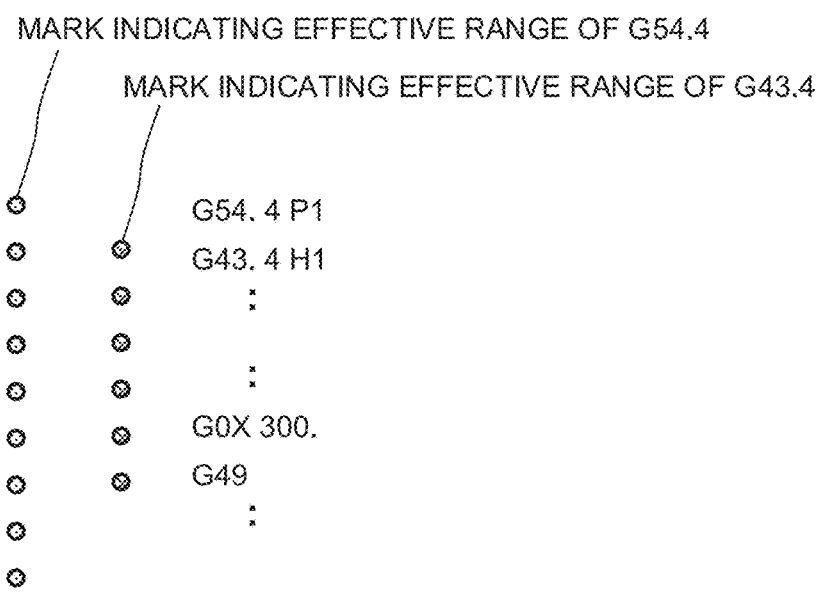
FIG. 7 is a diagram illustrating an example of display by the display device for the machining program.

As illustrated in FIG. 7, the modal effective range display unit 160 may display the effective ranges of the modal G codes that are currently effective, with use of specified marks. In this example, the same mark is displayed at left of each of the blocks from "G43.4 H1" to "G49" that constitute the effective range of the modal G code "G43.4". Similarly, marks are displayed at left of blocks in which the modal G code "G54.4" is effective. The marks are displayed in lines numbered in the number of the effective modal G codes. In this example, the marks may have different shapes, colors, patterns, luminances, or the likes among the corresponding modal G codes.

Figure 8:
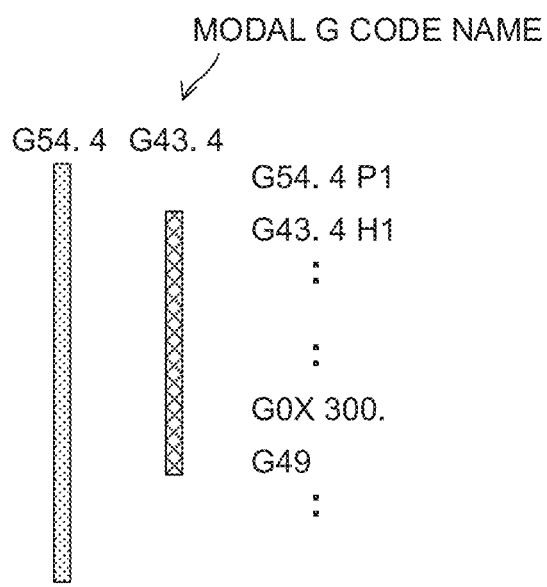
FIG. 8 is a diagram illustrating an example of display by the display device for the machining program.

As illustrated in FIG. 8, the modal effective range display unit 160 may display the band-like objects illustrated in FIG. 4 and the names of the modal G codes represented by the band-like objects. In this example, the plurality of band-like objects may have different colors, patterns, luminances, or the likes or are allowed to have a color, a pattern, a luminance, or the like that is identical. The modal effective range display unit 160 may display the backgrounds illustrated in FIG. 6, the marks illustrated in FIG. 7, and the names of the modal G codes represented by the same.

According to the embodiment, the user is capable of checking the modal G codes that are effective at the cursor position and the effective ranges of the modal G codes at first sight and is thus saved necessity to memorize the effective modal G codes. Therefore, mistakes due to lapses of memory and efforts for checking may be reduced.

The invention is not limited to the embodiment described above and may be modified appropriately within a scope not departing from purport of the invention. For instance, the modal list display unit 150 and the modal effective range display unit 160 may display only names and effective ranges of modal G codes that have been specified in advance by the user or in accordance with configurations or that have been selected based on specified criteria, instead of all the modal G codes that are effective at the cursor position, in the auxiliary window and the program window.

While the machining program is run, the program analysis unit 120 may identify and output a position (block) in the machining program 131 that is being executed, for instance. Then the modal list display unit 150 and the modal effective range display unit 160 display names and effective ranges of all or some of modal G codes that are effective at the block being executed, in the auxiliary window and the program window. Thus the modal G codes that are effective at pertinent point of time can be checked, not only while the machining program is edited but also while the machining program being run is displayed.

Though the embodiment of the present invention has been described above, the invention is not limited to the examples of the embodiment described above and can be embodied in other manners with appropriate modification.

The invention claimed is:

1. A display device for a machining program, the display device comprising:
   a display;
   a processor; and
   a memory comprising instructions executed by the processor to configure the display device to:
      store the machining program, a modal group information and a modal effective range information, wherein the modal group information includes a table that defines a descriptive text on a function for each of modal codes, and the modal effective range information includes a table that defines a group name of each of the modal codes and codes for cancellation of modal state;
      identify an attention block in the machining program;
      identify a modal state that is effective in the attention block and an effective range of the modal state with reference to the modal group information and the modal effective range information wherein the modal state is activated by a modal code in the matching program and remains effective until the modal code is altered or cancelled; and
      cause the display to visually display the effective range of the modal state along with the machining program.

2. The display device for the machining program according to claim 1, wherein the display device is further configured to cause the display to display a band-like object at a side of a plurality of blocks in the machining program that correspond to the effective range of the modal state.

3. The display device for the machining program according to claim 1, wherein the display device is further configured to cause the display to display a plurality of blocks in the machining program that correspond to the effective range of the modal state, with use of a graphic object.

4. The display device for the machining program according to claim 1, wherein the display device is further configured to cause the display to alter a background of a plurality of blocks in the machining program that correspond to the effective range of the modal state.

5. The display device for the machining program according to claim 1, wherein the display device is further configured to cause the display to display a mark for each of blocks in the machining program that are included in the effective range of the modal state.

6. The display device for the machining program according to claim 1, wherein the display device is further configured to cause the display to display a name of the modal state that is effective in the attention block, and
   wherein a color, a pattern, a luminance, or a mark the effective range of the modal state displayed on the display is identical to a color, a pattern, a luminance, or a mark of the name of the modal state displayed on the display.

7. The display device for the machining program according to claim 1, wherein the display device is further configured to cause the display to selectively display only specified modal states among modal states that are effective in the attention block.

8. The display device for the machining program according to claim 1, wherein the attention block is a block where a cursor position is located in editing of the machining program.

9. The display device for the machining program according to claim 1, wherein the attention block is a block that is being executed in running of the machining program.

10. The display device for the machining program according to claim 1, wherein the display device is a numerical control device or an information processing device which is able to display the machining program.

\* \* \* \* \*